United States Patent
Koo

(10) Patent No.: US 11,136,924 B1
(45) Date of Patent: Oct. 5, 2021

(54) THROTTLE BODY ASSEMBLY

(71) Applicant: Fitech Fuel Injection, Riverside, CA (US)

(72) Inventor: Kam Pui Koo, Hong Kong (CN)

(73) Assignee: FITECH FUEL INJECTION, Riverside, CA (US)

( * ) Notice: Subject to any disclaimer, the term of this patent is extended or adjusted under 35 U.S.C. 154(b) by 0 days.

(21) Appl. No.: 16/930,985

(22) Filed: Jul. 16, 2020

(51) Int. Cl.
| | |
|---|---|
| *F02D 9/10* | (2006.01) |
| *B60K 26/02* | (2006.01) |
| *F02D 9/02* | (2006.01) |
| *B60K 26/04* | (2006.01) |

(52) U.S. Cl.
CPC ............. *F02D 9/109* (2013.01); *B60K 26/02* (2013.01); *B60K 26/04* (2013.01); *F02D 9/02* (2013.01); *F02D 9/1065* (2013.01); *B60Y 2300/431* (2013.01); *F02D 2009/0269* (2013.01); *F02D 2009/0279* (2013.01)

(58) Field of Classification Search
CPC .......... F02D 9/109; F02D 9/1095; F02D 9/02; F02D 9/1065; F02D 2009/0269; F02D 2009/0279
USPC ........................................................ 123/336
See application file for complete search history.

(56) References Cited

U.S. PATENT DOCUMENTS

| | | | | |
|---|---|---|---|---|
| 4,391,247 A | * | 7/1983 | Shioyama | F02D 9/103 123/403 |
| 5,749,336 A | * | 5/1998 | Tamaki | F02D 9/1045 123/337 |
| 6,047,950 A | * | 4/2000 | Pontoppidan | F02D 9/10 123/337 |
| 6,186,115 B1 | * | 2/2001 | Nishimura | F02D 9/10 123/337 |

FOREIGN PATENT DOCUMENTS

JP 2009197810 A * 9/2009

* cited by examiner

*Primary Examiner* — Mahmoud Gimie
(74) *Attorney, Agent, or Firm* — Dickinson Wright PLLC

(57) ABSTRACT

A throttle body assembly that includes a throttle body defining a primary air passage for an air intake system of an automobile. A valve is located in the primary air passage and is moveable along a travel path between a closed position, wherein an air flow through the primary air passage is blocked, and an open position, wherein the air flow can travel through the primary air passage. The open position includes a plurality of positions along a scale between a minimum amount of openness and a maximum amount of openness and a greater air flow rate corresponds to a larger amount of openness. A limiter is located in the primary air passage adjacent to the valve and reduces the relationship between openness and the corresponding flow rate for a portion of the travel path.

20 Claims, 5 Drawing Sheets

THROTTLE BODY ASSEMBLY

BACKGROUND OF THE INVENTION

1. Field of the Invention

The present invention relates to a throttle body assembly including a limiter for reducing air intake through the throttle body assembly under specific operational conditions.

2. Related Art

This section provides background information related to the present disclosure which is not necessarily prior art.

A throttle body is a component of an automobile that controls an amount of air flow that enters an intake manifold and ultimately an associated engine. The throttle body typically includes an air passage and a butterfly valve in the air passage for controlling the amount of air flow through the air passage. When the butterfly valve is closed, air is substantially restricted from flowing through the air passage. As the butterfly valve is opened, the butterfly valve no longer restricts the air passage allowing the air flow to enter the engine where it is mixed with fuel and burned. The degree that the butterfly valve is opened controls the amount of the air flow, which is typically directly correlated to the revolutions per minute (RPM) of the engine. Therefore, the amount of air flow may similarly be directly correlated to fuel economy.

While developments of throttle body technology have improved certain aspects of controlling the amount of air flow, there are still persistent problems within specific operational parameters. For example, when the butterfly valve opens slightly from a closed position to an idle or near idle condition, there is a noticeable jump in the amount of air intake and resulting RPM. This sudden initial increase in the amount of air intake is difficult to accurately control and can result in a non-optimized driving experience and a reduction to fuel economy.

Accordingly, there is a continuing need to develop throttle body technology to allow a user to more precisely control the amount of air flow into the engine during an initial opening of the butterfly valve under idle or near idle conditions.

SUMMARY OF THE INVENTION

This section provides a general summary of the disclosure and is not to be interpreted as a complete and comprehensive listing of all of the objects, aspects, features and advantages associated with the present disclosure.

The subject invention provides a throttle body assembly. The throttle body assembly comprises a throttle body having at least one interior wall extending along an axis to define at least one primary air passage for guiding an air flow. A valve is disposed in the at least one primary air passage and includes a valve plate delimited by a pair of opposing edges. The pair of opposing edges are disposed in an aligned relationship and also in close proximity to the interior wall in a closed position to block substantially all of the air flow through the at least one primary air passage. The valve plate is pivotable from the closed position towards an open position to move the pair of opposing edges along a travel path and into a spaced relationship with the interior wall to allow air flow through the at least one primary air passage. A limiter extends from the interior wall into the at least one primary air passage to define a contour surface extending along a portion of the travel path of one of the pair of opposing edges to reduce air flow between the respective opposing edge and the interior wall during an initial movement of the valve plate from the closed position towards the open position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

Example embodiments will now be described more fully with reference to the accompanying drawings, which generally illustrate a throttle body assembly. However, the example embodiments are only provided so that this disclosure will be thorough, and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the throttle body assembly is intended to provide additional control over the amount of air flow transferred through the throttle body assembly and to an associated engine under specific operational parameters, such as idle or near idle conditions.

Figure 1:
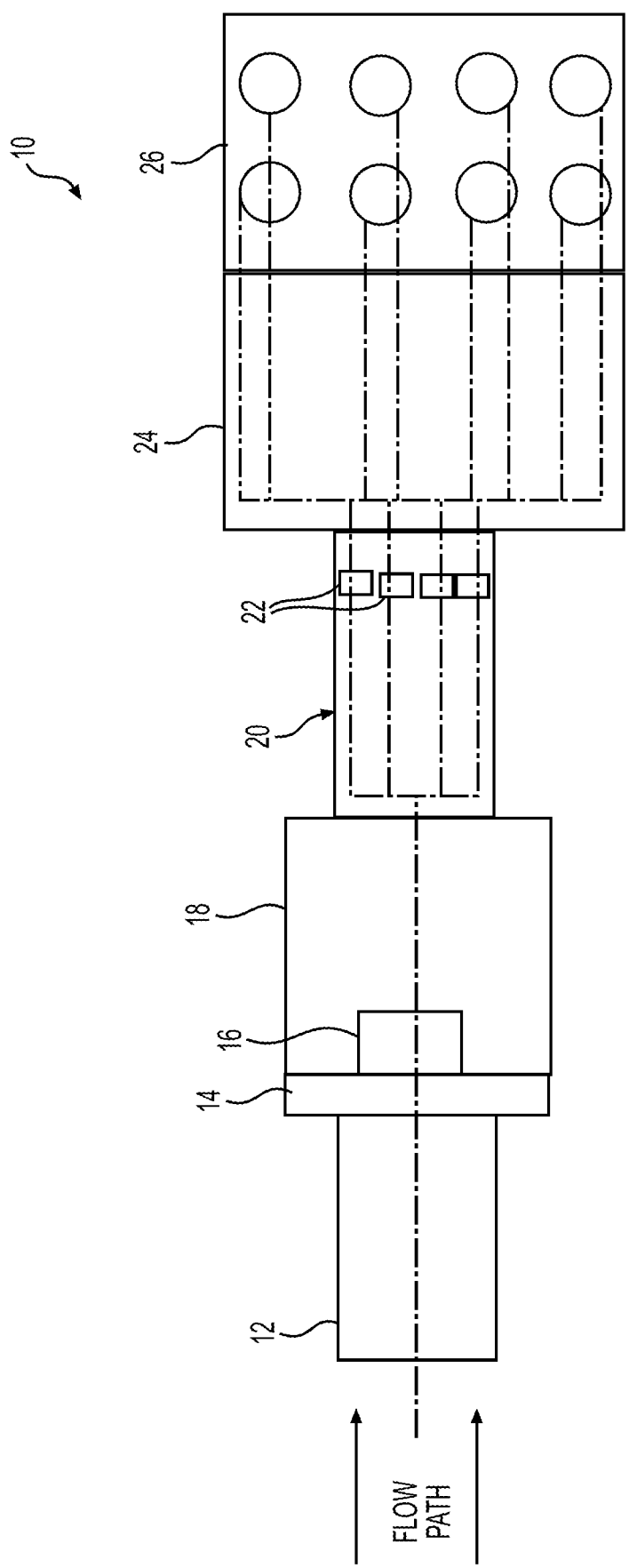
FIG. 1 is schematic view of an air intake system in an automobile that includes a throttle body assembly.

With initial reference to FIG. 1, a schematic image of an air intake system 10 for an automobile is provided. In a preferred arrangement, the air intake system 10 includes an air intake 12 wherein air enters the air intake system 10 and is filtered by a filter 14. The flow path of the air is illustrated by a dotted line marked "FLOW PATH." After the air is filtered, it travels sequentially past an air flow sensor 16 and a resonance reducer 18 before it reaches a throttle body assembly 20. As will be described in further detail below, the throttle body assembly 20 includes at least one limiter 22 for controlling the amount of air flow that passes through the throttle body assembly 20, i.e., the limiter 22 helps control the flow rate. The controlled air flows through the throttle body assembly 20 to an intake manifold 24 where it is distributed into an engine 26. As the air is distributed to the engine 26, it mixes with injected fuel to facilitate combustion in the engine 26 and changes in air flow rate affect the operational parameters of the engine 26, such as RPM. The engine 26 may include eight cylinders 28, i.e., the engine 26 may be a V8.

Figure 2:
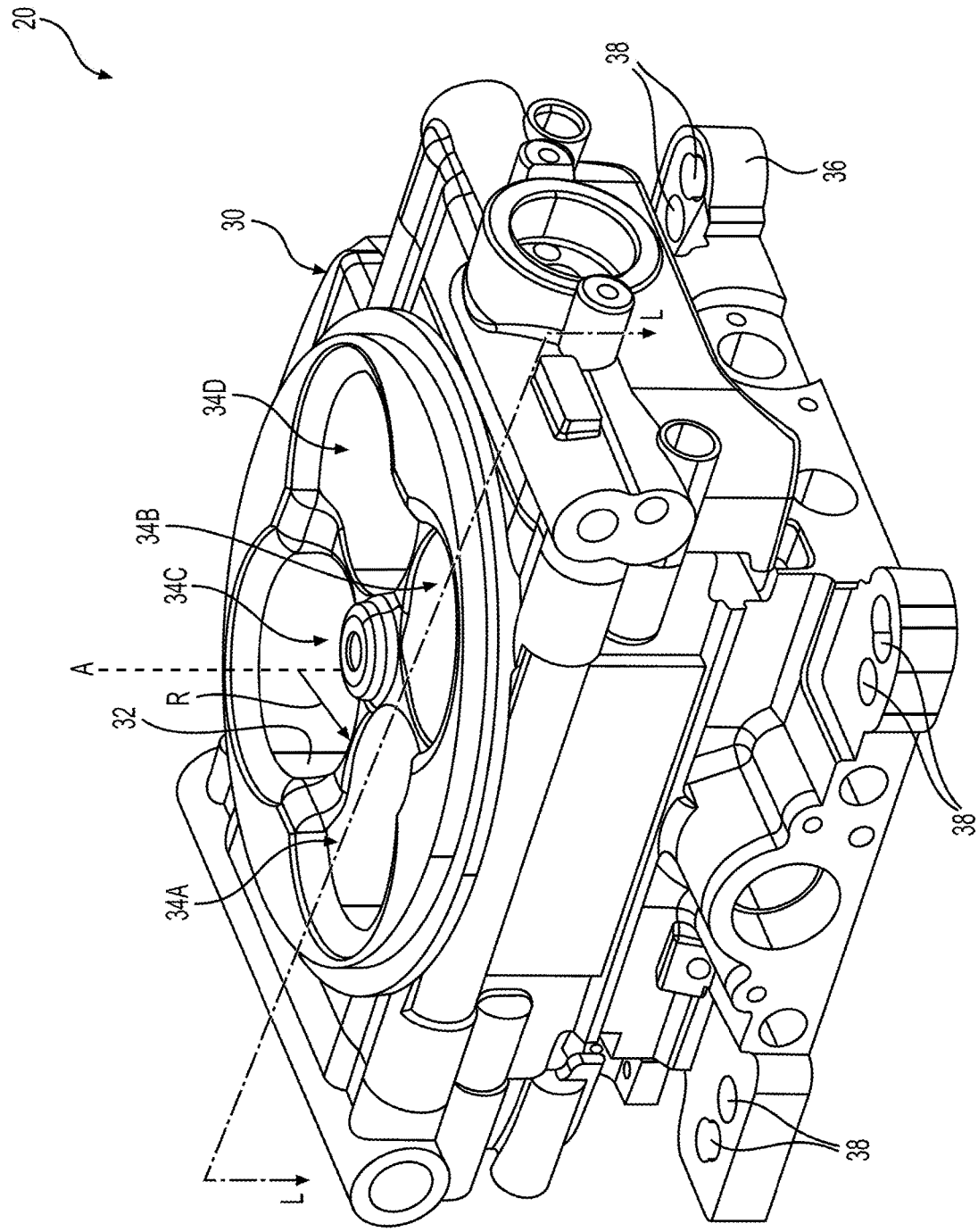
FIG. 2 is a perspective view of the throttle body assembly.

FIG. 2 illustrates a perspective view of the throttle body assembly 20. The throttle body assembly 20 includes a throttle body 30 having at least one interior wall 32 that defines at least one primary air passage 34 (see FIGS. 4 and 5). The at least one primary air passage 34 directs the air flow through the throttle body 30 between adjacent components of the air intake system 10. In a preferred arrangement, the at least one primary air passage 34 includes a first primary air passage 34A, a second primary air passage 34B, a third primary air passage 34C, and a fourth primary air passage 34D (FIG. 1), each extending axially through the throttle body 30 in a parallel relationship to one another. The interior wall 32 may be smooth and extend uniformly about an axis A at a radius R such that the at least one primary air passage 34 is generally cylindrical or at least includes a cylindrical portion at the radius R. The throttle body 30 further includes a mount plate 36 that defines a plurality of fastener bores 38 for connecting the throttle body assembly 20 in its operational position between the adjacent components of the air intake system 10.

Figure 3:
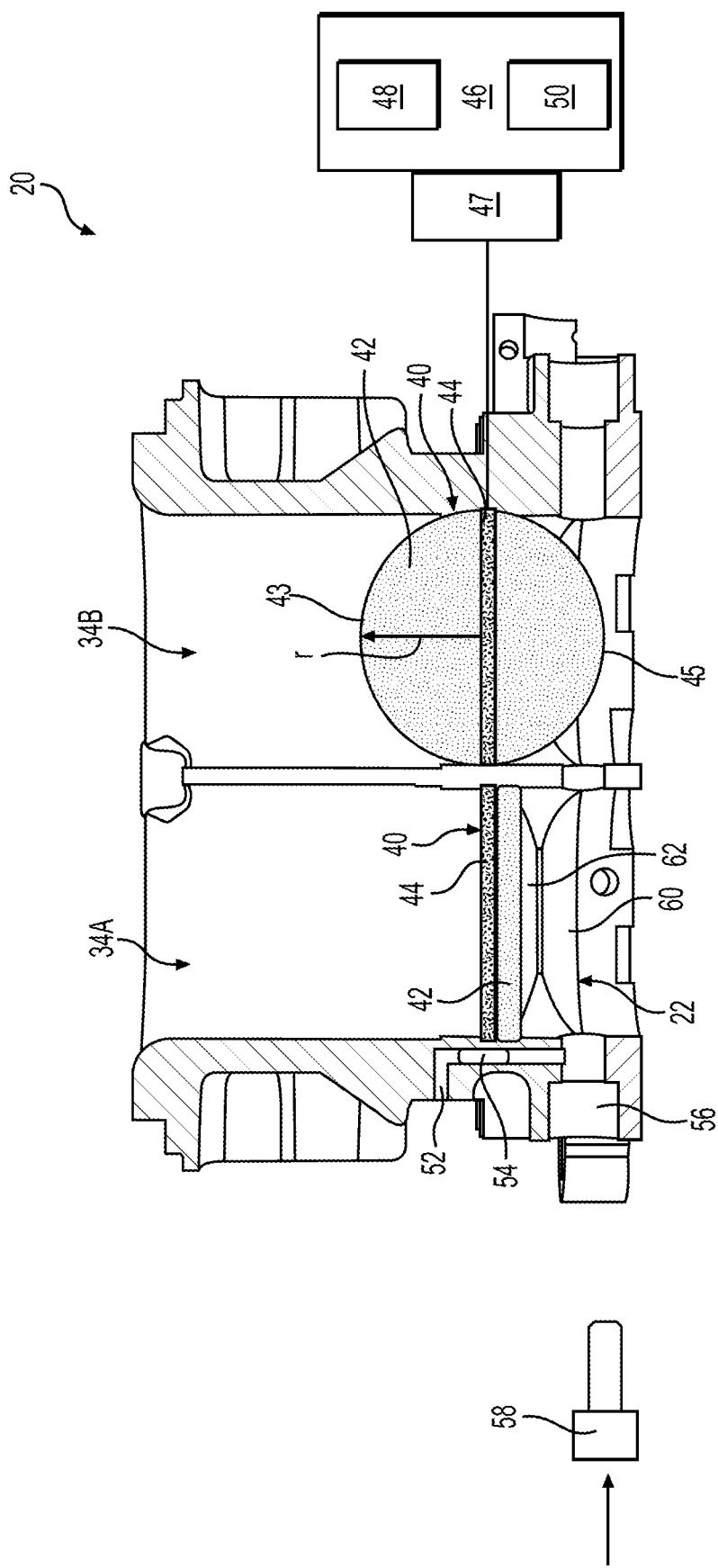
FIG. 3 is a cross-sectional side view of the throttle body assembly taken along the line L-L provided in FIG. 2.

With reference now to both FIG. 2 and FIG. 3, a valve 40 is located in the at least one primary air passage 34 and is moveable between a closed position and an open position. The open position includes a plurality of positions along a scale between a minimum amount of openness and a maximum amount of openness with a greater air flow rate corresponding to a larger amount of openness. For purposes of illustration, the first primary air passage 34A and the second primary air passage 34B are shown in FIG. 3, wherein the valve 40 in the first primary air passage 34A is in a closed position and the valve 40 in the second primary air passage 34B is in the open position. However, in operation, it should be appreciated that the respective valves 40 would typically move synchronously. Each valve 40 includes a valve plate 42, e.g., a butterfly plate, and a pivot shaft 44 connected to the valve plate 42 that pivots or otherwise moves the valve plate 42 between the closed and open positions. The valve plate 42 is delimited by a plurality of opposing edges, such as a pair of opposing edges 43, 45 that may form a circular shape extending from a center of the valve plate 42 at a radius r that is equal to or slightly less than the radius R of the at least one primary air passage 34. Accordingly, in the closed position the valve plate 42 is perpendicular to the axis A and blocks all or substantially all of the air flow by aligning the pair of opposing edges 43, 45 in close proximity with the interior wall 32. In the open position, the pair of opposing edges 43, 45 are pivoted so there is a space between the pair of opposing edges 43, 45 and the interior wall 32, the degree of pivoting directly corresponding to the amount of openness.

Movement of the pivot shaft 44 may be effectuated by an actuator 46 (schematically shown), which may include a throttle cable operably connected to a gas pedal, an ECU and motor arrangement, or other arrangements. The pivot shaft 44 may also be biased in the closed position via a torsion spring 47 (schematically shown). The actuator 46 may further include a throttle position sensor 48 for monitoring the positioning of the valve 40 and a pressure sensor 50 for monitoring the amount of air flow. Readings from the position sensor 48 and pressure sensor 50 may be used to regulate the flow rate of fuel being contemporaneously injected at the engine 26.

The throttle body 30 may further define an air bypass port 52 that allows a small amount of air flow to bypass the valve 40 such that the engine 26 can receive air when the automobile is idling and/or when the valve 40 is in the closed position. An idle air control valve 54 may be located in the air bypass port 52 to control the flow rate therethrough. For example, the idle air control valve 54 may be configured to allow a larger air flow rate during a cold start than in other scenarios. The air bypass port 52 may further include a bypass branch 56 that bypasses the idle air control valve 54 and sets a minimum limit to the amount of air flow when the valve 40 is in the closed position. An idle adjustment screw 58 may further be provided to set the minimum limit of the bypass branch 56 by being inserted therein and constricting the bypass branch 56.

Figure 5:
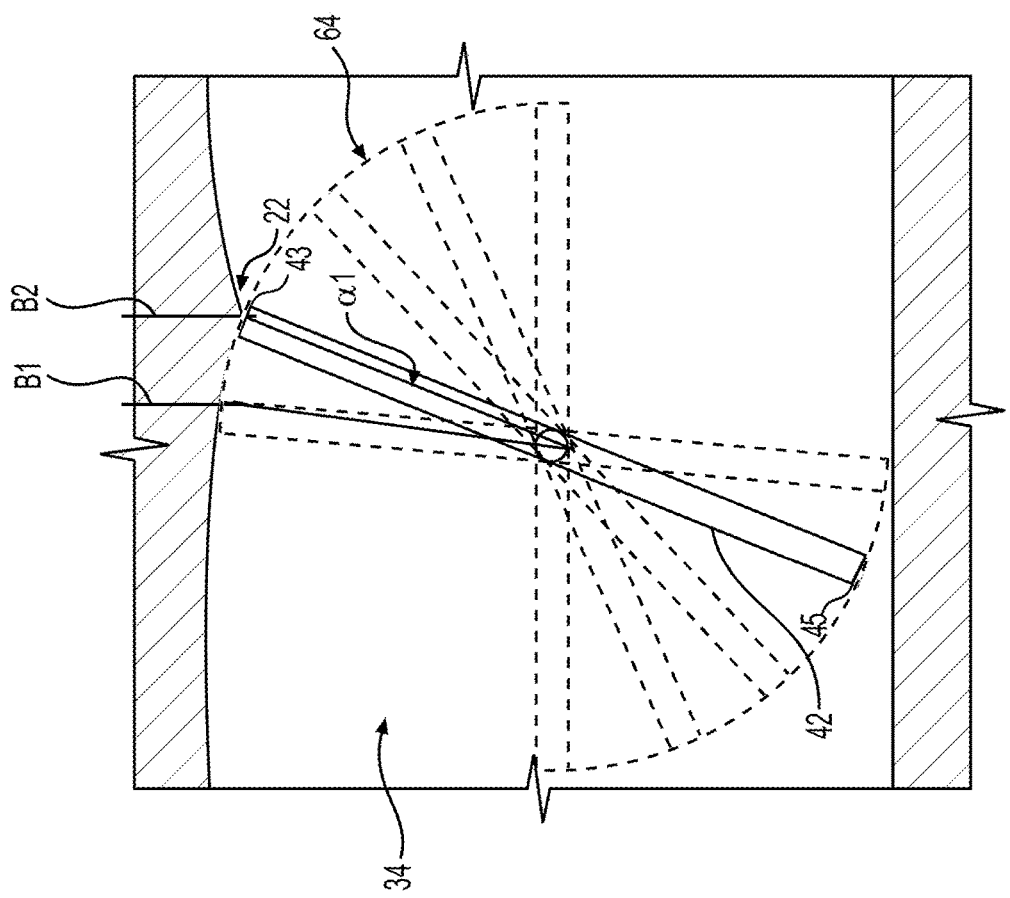
FIG. 5 is a cross-sectional side view of the throttle body assembly.
Figure 4:
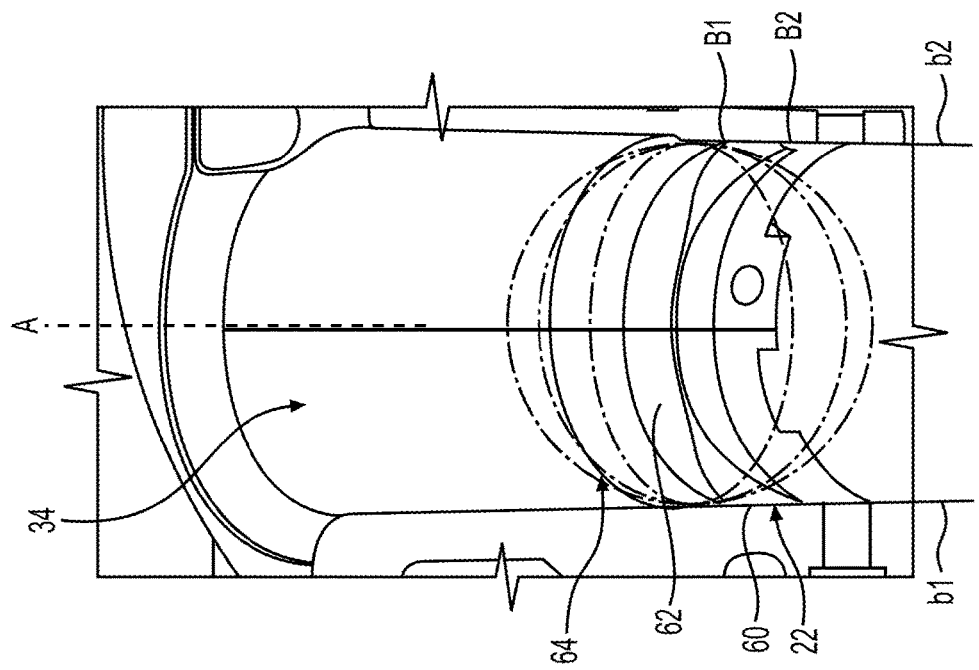
FIG. 4 is a cross-sectional perspective view of the throttle body assembly.

FIGS. 3 through 5 illustrate a cross-section of the throttle body 30 and the primary air passage 34. As illustrated therein, the limiter 22 is located on the interior wall 32 and includes a limiter body 60 that extends from the interior wall 32 and into the at least one primary air passage 34 or, in arrangements with a plurality of the primary air passages 34A, 34B, etc., a limiter 22 may be disposed in each of the primary air passages 34A, 34B, etc. The limiter body 60 is located adjacent to the valve 40 and includes a contour surface 62 that matches the valve plate 42 such that the air flow rate is at least partially reduced as the valve 40 is moved from the closed position to the open position. When the valve plate 42 is moved by the pivot shaft 44, the pair of opposing edges 43, 45 of the valve plate 42 outline a travel path 64 (FIG. 4 and FIG. 5). As such, in arrangements that include the valve plate 42 having the pair of opposing edges 43, 45 that define a circular shape, the travel path 64 defines at least part of a sphere having the radius r as illustrated by the phantom lines. In such instances, the contour surface 62 of the limiter 22 will match a portion of the spherical region with the same or a slightly larger radius than r taken from the center of the valve plate 42. The limiter 22 extends only partially about the axis A and the interior wall 32. Therefore, as the valve plate 42 is moved along the travel path 64, air flow will be restricted between an adjacent opposing edge of the valve plate 42 and limiter 22 while being unrestricted around sections of the interior wall 32 where the limiter 22 is not present. The limiter 22 may be formed of the same material as the torque body 30 and may be integrally constructed, e.g., molded therewith. However, it should also be appreciated that the limiter 22 may alternatively be non-integral and connected after formation of the torque body 30. It should be appreciated that in other arrangements, the pair of opposing edges 43, 45 may be otherwise equally curved from the center of the valve plate such the travel path of the pair of opposing edges 43, 45 outlines at least part of a rounded surface that is not necessarily spherical and the contour surface overlays a portion of the at least part of the rounded surface With reference now to FIG. 4 and FIG. 5, the location and size of the limiter 22 will depend upon various operational factors and preferences. In one arrangement, the contour surface 62 extends along a first direction along the axis A and a second direction around the axis A. The contour surface 62 is therefore delimited by a pair of opposing axial boundaries B1 and B2 spaced along the axis A from one another and a pair of opposing radial boundaries b1 and b2 that are spaced radially about the axis A.

In one arrangement, the spacing between the pair of axial boundaries B1 and B2 results in the contour surface 62 extending less than one radian in the axial direction, as measured from the center of the valve plate 42. In another arrangement, the contour surface 62 may extend less than 0.5 radians, less than 0.4 radians, less than 0.3 radians, less than 0.2 radians, or less than 0.1 radians. In the same or other arraignments, the contour surface 62 extends more than 0.1 radians, more than 0.2 radians, more than 0.3 radians, more than 0.4 radians, or more than 0.5 radians. In the same or other arrangements, the contour surface 62 may extend between 0.2 and 0.4 radians. In one preferred arrangement, the contour surface 62 extends approximately 0.3 radians such that an angle α1 (FIG. 5) formed between the axial boundaries B1 and B2 and the center of the valve plate 42 equals between 20° and 15°, and more preferably yet 17°. The angle α1 may alternatively, be less than 45°, less than 35°, less than 25°, or less than 20°.

In accordance with the above example measurements, the contour surface 62 extending between the pair of radial boundaries b1 and b2 and the spacing between the pair of radial boundaries b1 and b2 are both respectively larger than the contour surface 62 extending between the axial boundaries B1 and B2 and the spacing between the axial boundaries B1 and B2. For example, the contour surface 62 extending between the pair of the radial boundaries b1 and b2 may be less than 4 radians, less than 3 radians, less than 2 radians, or less than 1 radian. In one preferred arrangement, the angle α1 between the center of the valve plate 42 and the axial boundaries B1 and B2 is 17° and an angle α2 (FIG. 6) between the center of the valve plate 42 and the radial boundaries is equal to 180°. In this preferred arrangement, the degree in which the valve 40 is opened has been found to form a direct and linear relationship with the resulting RPM of the engine 26 for improved performance. However, it should be appreciated that other dimensions may be applied to the limiter 22 without departing from the scope of the subject disclosure, for example, the angle α2 may be less than 180°.

As best illustrated in FIG. 5, the limiter 22 is located adjacent to one of the pair of opposing edges 43, 45 of the valve plate 42 that moves along a forward direction of the axis A during movement from the closed position to the open position. However, it should be appreciated that the limiter 22 may be located on an opposing surface of the interior wall 32 such that it is adjacent to the opposing edge of the valve plate 42 that moves along a rearward direction of the axis A during movement from the closed position to the open position.

Figure 6:
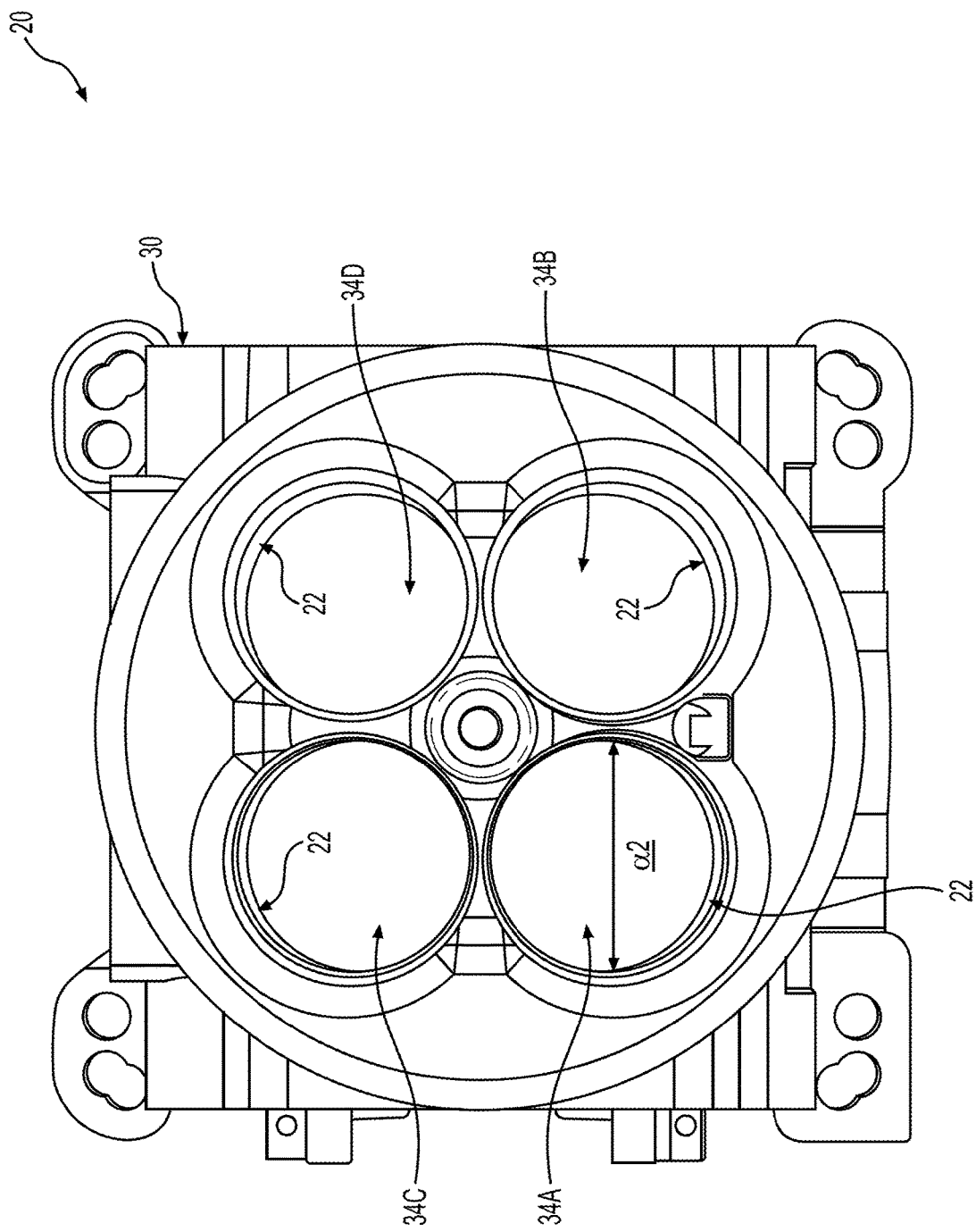
FIG. 6 is a top view of the throttle body assembly.

Referring to FIG. 6 (and also back to FIG. 2) it should be appreciated that in arrangements with multiple primary air passages 34A, 34B, etc., each of the primary air passages 34A, 34B, etc., may include a limiter 22 in the same location along the interior wall 32 relative to the edge of the associated valve plate 42 that moves in the forward direction during movement from the closed position to the open position. Alternatively, each of the primary air passages 34A, 34B, etc., may include a limiter 22 in the same location along the interior wall 32 relative to the edge of the associated valve plate 42 that moves in the rearward direction during movement from the closed position to the open position. In the arrangement shown in FIG. 2 and FIG. 4, the primary air passages 34A, 34B, 34C, 34D and associated limiters 22 are symmetrically arranged along a center point between each of the primary air passages 34A, 34B, 34C, 34D. As such, because the valves 40 in each of the primary air passages 34A, 34B, 34C, 34D move synchronously, the air flow rate through each of the primary air passages 34A, 34B, 34C, 34D should be the same or substantially the same.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A throttle body assembly comprising:
   a throttle body having at least one interior wall extending along an axis to define at least one primary air passage for guiding an air flow;
   a valve disposed in the at least one primary air passage and including a valve plate delimited by a pair of opposing edges disposed in an aligned relationship and also in close proximity to the interior wall in a closed position to block substantially all of the air flow through the at least one primary air passage;
   the valve plate pivotable from the closed position towards an open position to move the pair of opposing edges along a travel path and into a spaced relationship with the interior wall to allow air flow through the at least one primary air passage;
   a limiter extending from the interior wall into the at least one primary air passage to define a contour surface extending along a portion of the travel path of one of the pair of opposing edges to reduce air flow between the respective opposing edge and the interior wall during an initial movement of the valve plate from the closed position towards the open position; and
   wherein the degree of pivoting along the travel path of the valve plate directly corresponds to a resulting RPM in a provided engine and the limiter is configured to form a linear relationship between the degree of pivoting along the travel path and the resulting RPM.

2. The throttle body assembly of claim 1, wherein the pair of opposing edges are equally spaced from a center of the valve plate at a first radius to form a circular shape and wherein the travel path of the pair of opposing edges outlines at least part of a sphere and the contour surface overlays a portion of the at least part of the sphere at a radius equal to or more than the first radius.

3. The throttle body assembly of claim 2, wherein the contour surface extends between a pair of axial boundaries spaced along the axis and a pair of radial boundaries spaced about the axis and along the interior wall.

4. The throttle body assembly of claim 3, wherein the spacing between the pair of axial boundaries forms an angle with respect to the center of the valve plate that is less than 45°.

5. The throttle body assembly of claim 4, wherein the spacing between the pair of axial boundaries forms an angle with respect to the center of the valve plate that is less than 35°.

6. The throttle body assembly of claim 5, wherein the spacing between the pair of axial boundaries forms an angle with respect to the center of the valve plate that is less than 25°.

7. The throttle body assembly of claim 6, wherein the spacing between the pair of axial boundaries forms an angle with respect to the center of the valve plate that is less than 20° and more than 15°.

8. The throttle body assembly of claim 3, wherein the spacing between the pair of radial boundaries forms an angle with respect to the center of the valve plate that is equal to or less than 180°.

9. The throttle body assembly of claim 8, wherein the spacing between the pair of axial boundaries forms an angle with respect to the center of the valve plate that is less than 20° and more than 15°.

10. The throttle body assembly of claim 3, wherein the spacing between the pair of radial boundaries forms a first angle with respect to the center of the valve plate and the spacing between the pair of axial boundaries forms a second angle with respect to the center of the valve plate, wherein the first angle is larger than the second angle.

11. The throttle body assembly of claim 1, wherein the limiter is formed of the same material as the throttle body.

12. The throttle body assembly of claim 11, wherein the limiter is integral with the throttle body.

13. The throttle body assembly of claim 1, wherein the at least one interior wall includes a plurality of interior walls and the at least one primary air passage includes a plurality of primary air passages, wherein each of the primary air passages contains a valve and limiter.

14. The throttle body assembly of claim 13, wherein each of the valves and each of the limiters are located within a respective one of the plurality of primary air passages and are symmetrically disposed and oriented about a center axis between the plurality of primary air passages.

15. The throttle body assembly of claim 14, wherein the plurality of primary air passages includes four primary air passages.

16. The throttle body assembly of claim 1, wherein the valve further includes a pivot shaft connected to the valve plate and the movement of the valve plate includes pivoting the pivot shaft.

17. The throttle body assembly of claim 16, wherein the pivot shaft is biased in the closed position by a torsion spring.

18. The throttle body assembly of claim 17, further including an actuator and wherein the pivot shaft is operably connected to the actuator configured to connect to a provided throttle cable operably connected to a provided gas pedal.

19. The throttle body assembly of claim 1, wherein the pair of opposing edges are equally curved from a center of the valve plate and wherein the travel path of the pair of opposing edges outlines at least part of a rounded surface and the contour surface overlays a portion of the at least part of the rounded surface.

20. The throttle body assembly of claim 14, wherein each of the limiters are oriented to face the center axis.

* * * * *